(12) United States Patent
Gibbons et al.

(10) Patent No.: US 10,144,086 B2
(45) Date of Patent: Dec. 4, 2018

(54) WIRE FEEDER DRIVE ASSEMBLY

(71) Applicant: Hobart Brothers Company, Troy, OH (US)

(72) Inventors: Eugene G. Gibbons, Huber Heights, OH (US); Darrell L Sickels, Troy, OH (US); Marlin E. Burns, Troy, OH (US)

(73) Assignee: Hobart Brothers Company, Troy, OH (US)

( * ) Notice: Subject to any disclaimer, the term of this patent is extended or adjusted under 35 U.S.C. 154(b) by 196 days.

(21) Appl. No.: 13/863,173

(22) Filed: Apr. 15, 2013

(65) Prior Publication Data

US 2013/0341314 A1   Dec. 26, 2013

Related U.S. Application Data

(60) Provisional application No. 61/663,225, filed on Jun. 22, 2012.

(51) Int. Cl.
| | |
|---|---|
| *B23K 9/00* | (2006.01) |
| *B23K 9/12* | (2006.01) |
| *B23K 9/28* | (2006.01) |
| *B23K 9/133* | (2006.01) |

(52) U.S. Cl.
CPC .......... *B23K 9/124* (2013.01); *B23K 9/1336* (2013.01)

(58) Field of Classification Search
CPC .......... B23K 9/12; B23K 9/124; B23K 3/063; B23K 9/125; B23K 9/133; B23K 9/1336; B23K 9/173; B23K 9/00; B23K 9/28
USPC .................... 228/11, 33, 4.5; 219/136, 137.7
See application file for complete search history.

(56) References Cited

U.S. PATENT DOCUMENTS

| | | | | |
|---|---|---|---|---|
| 2,767,302 A | * | 10/1956 | Brashear, Jr. ........... | 219/137.51 |
| 3,107,291 A | * | 10/1963 | Evans .................. | B23K 9/1336 |
| | | | | 219/137.71 |
| 3,248,516 A | * | 4/1966 | Gilliland .................. | 219/137.71 |
| 3,309,497 A | * | 3/1967 | Kensrue ..................... | 219/137.9 |
| 3,331,545 A | * | 7/1967 | Olivieri .......................... | 226/187 |
| 3,382,398 A | * | 5/1968 | Austin et al. .................. | 314/69 |
| 3,430,832 A | * | 3/1969 | Meyer ............................ | 226/174 |

(Continued)

FOREIGN PATENT DOCUMENTS

| | | | |
|---|---|---|---|
| GB | 1125440 A | | 8/1968 |
| JP | 2000079475 A | * | 3/2000 |

(Continued)

OTHER PUBLICATIONS

International Search Report from PCT application No. PCT/US2011/064716 dated Apr. 4, 2012, 11 pgs.

(Continued)

*Primary Examiner* — Michael G Hoang
(74) *Attorney, Agent, or Firm* — McAndrews, Held & Malloy, Ltd.

(57) ABSTRACT

A drive assembly is provided for driving welding wire through a welding wire feeder. The drive assembly comprises an insulating base and a conductive base secured to one another. Both bases have features that allow for mounting in the wire feeder and for mounting various drive components. The conductive base is energized during operation, and the isolative base insulates the conductive base from components of the wire feeder enclosure. Features of the assembly improve operation and facilitate assembly.

20 Claims, 3 Drawing Sheets

(56) References Cited

U.S. PATENT DOCUMENTS

| | | | |
|---|---|---|---|
| 3,570,325 A | 3/1971 | Kroll | |
| 3,576,966 A * | 5/1971 | Sullivan | 219/137 R |
| 3,675,837 A | 7/1972 | Gerould | |
| 3,718,798 A * | 2/1973 | Randolph et al. | 219/60 A |
| 4,083,079 A | 4/1978 | Vermillion | |
| 5,223,671 A * | 6/1993 | Alfieri | 174/50 |
| 5,743,140 A * | 4/1998 | Gustafson | 74/6 |
| 5,816,466 A * | 10/1998 | Seufer | 226/187 |
| 5,918,195 A | 6/1999 | Halgrimson | |
| 6,137,057 A | 10/2000 | Gutgsell | |
| 6,356,045 B1 | 3/2002 | Newton | |
| 6,388,234 B1 * | 5/2002 | Collins et al. | 219/137.7 |
| 6,427,894 B1 * | 8/2002 | Blank et al. | 226/177 |
| 6,479,795 B1 * | 11/2002 | Albrecht et al. | 219/137.2 |
| 6,568,578 B1 | 5/2003 | Kensrue | |
| 6,658,960 B2 | 12/2003 | Babin | |
| 6,868,590 B2 | 3/2005 | Bentrim | |
| 6,903,305 B2 | 6/2005 | Mukai | |
| 6,979,785 B2 * | 12/2005 | Yamasaki | H01H 25/041 200/6 A |
| 7,026,574 B2 | 4/2006 | Belfiore | |
| 7,124,697 B2 | 10/2006 | Foley | |
| 7,238,918 B2 | 7/2007 | Matiash | |
| 7,374,074 B2 | 5/2008 | Matiash | |
| 7,415,791 B2 | 8/2008 | Williams, III | |
| 7,427,726 B2 * | 9/2008 | Enyedy | B23K 9/1336 219/136 |
| 7,441,682 B2 * | 10/2008 | Kerekes et al. | 226/187 |
| 7,520,720 B2 * | 4/2009 | Welch | 415/199.1 |
| 7,531,768 B2 | 5/2009 | Matiash | |
| 7,615,718 B2 * | 11/2009 | Byerly | 219/58 |
| 7,687,742 B2 * | 3/2010 | Belfiore et al. | 219/137.7 |
| 7,692,117 B2 | 4/2010 | Belfiore | |
| 7,767,934 B2 | 8/2010 | Christopher | |
| 7,977,604 B2 | 7/2011 | Ertmer | |
| 8,276,307 B2 * | 10/2012 | Deros | 42/127 |
| 8,450,647 B2 | 5/2013 | Leiteritz | |
| 2004/0016736 A1 | 1/2004 | Huismann | |
| 2004/0104614 A1 * | 6/2004 | Higley et al. | 297/452.4 |
| 2005/0224484 A1 * | 10/2005 | Matiash | 219/137.2 |
| 2005/0224550 A1 | 10/2005 | Matiash | |
| 2006/0138114 A1 | 6/2006 | Belfiore | |
| 2007/0108172 A1 | 5/2007 | Belfiore | |
| 2008/0035625 A1 | 2/2008 | Ertmer | |
| 2008/0035626 A1 | 2/2008 | Christopher | |
| 2008/0296278 A1 | 12/2008 | Meckler | |
| 2009/0242535 A1 * | 10/2009 | Minato et al. | 219/137.31 |
| 2010/0133788 A1 * | 6/2010 | Cunningham et al. | 280/624 |
| 2012/0125905 A1 * | 5/2012 | Anzengruber et al. | 219/137.63 |
| 2012/0152926 A1 * | 6/2012 | Matiash et al. | 219/137.7 |
| 2012/0186689 A1 * | 7/2012 | Burns et al. | 140/147 |
| 2012/0298082 A1 * | 11/2012 | Agemura | 123/634 |

FOREIGN PATENT DOCUMENTS

| | | |
|---|---|---|
| JP | 2003001421 A | 1/2003 |
| WO | 0003295 A1 | 1/2000 |
| WO | 02096234 A1 | 12/2002 |

OTHER PUBLICATIONS

International Search Report from PCT application No. PCT/US2012/030828 dated Jul. 16, 2012, 10 pgs.

* cited by examiner

WIRE FEEDER DRIVE ASSEMBLY

CROSS REFERENCE TO RELATED APPLICATIONS

This application is a Non-Provisional Patent Application of U.S. Provisional Patent Application No. 61/663,225, entitled "Wire Feeder Drive Assembly and Method", filed Jun. 22, 2012, which is herein incorporated by reference.

BACKGROUND

The present invention relates generally to welding systems, and more particularly to a wire drive mechanism for use in welding wire feeders.

A wide range of welding systems have been developed and are currently in use. In one type of welding system a welding wire is introduced into a drive mechanism and pushed towards a welding torch where it is fed to a welding application. Electric current and voltage are imparted on the wire to establish and sustain an arc between the wire and the workpiece to be welded. Welding systems of this type are often referred to as gas metal arc welding systems (GMAW), although similar systems may be used with wire that is not gas shielded, such as flux cored wire.

In welding wire feeders, it is generally necessary to draw welding wire from a spool and drive it actively toward the welding torch, passing through a weld and torch cable. Challenges have long existed in the design of the drive mechanisms, which must be compact, cost effective, yet sufficiently robust to withstand years of use. There is a continuing need in the field for improved welding wire drive mechanisms.

BRIEF DESCRIPTION

The present invention provides a welding wire drive technique designed to respond to such needs. The invention incorporates several innovations into a drive mechanism that may be used for any suitable welding system in which wire is drawn from a spool and driven towards a welding torch. In accordance with certain aspects of the invention, a welding wire drive comprises a conductive base configured to remain at a welding power potential during operation and to support drive components to draw welding wire from a spool and to advance the welding wire towards a welding torch, the conductive base transferring power to a torch cable during operation. An insulating base is secured to the conductive base and insulates the conductive base from an enclosure in which the drive is disposed, the insulating base having at least one extension to prevent foreign objects from entering into contact with the enclosure and the conductive base.

In accordance with another aspect, a welding wire drive comprises a conductive base configured to remain at a welding power potential during operation and to support drive components to draw welding wire from a spool and to advance the welding wire towards a welding torch, the conductive base transferring power to a torch cable during operation. An insulating base is secured to the conductive base and insulates the conductive base from an enclosure in which the drive is disposed. A motor and gear reducer assembly is supported on a side of the insulating base opposite the conductive base. The motor and gear reducer assembly is supported by fasteners extending through a first set of apertures in the insulating base and a second set of apertures in the conductive base. The apertures are disposed to permit the motor and gear reducer assembly to be mounted in any one of a plurality of angular orientations. The first set of apertures may comprise fewer apertures than the second set, and extensions may extend into the unused apertures of the conductive base when fasteners are not installed in them.

In accordance with yet another aspect, a welding wire drive comprises a conductive base configured to remain at a welding power potential during operation and to support drive components to draw welding wire from a spool and to advance the welding wire towards a welding torch, the conductive base transferring power to a torch cable during operation. An insulating base is secured to the conductive base and insulates the conductive base from an enclosure in which the drive is disposed. A motor and gear reducer assembly is supported on a side of the insulating base opposite the conductive base. A drive roll, an idler roll and a tension adjustment assembly are disposed to compress and drive the welding wire. The idler roll is supported on a lever. The tension adjustment assembly allows for adjusting forces exerted by the idler roll. The lever comprises a slot for receiving a shaft of the tension adjustment assembly and a contoured surface at least partially surrounding the slot. The tension adjustment assembly comprises a compression component having a lower surface contoured to conform to the contoured surface of the lever.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
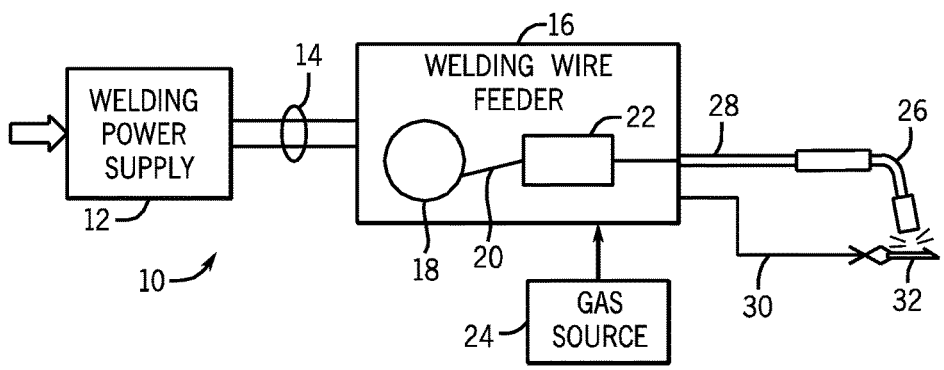
FIG. 1 is a simplified diagrammatical representation of an exemplary welding system including a welding power supply and a welding wire feeder having a drive in accordance with aspects of the present techniques.

Turning now to the drawings, and referring first to FIG. 1, an exemplary welding system 10 is illustrated as including a welding wire supply 12 coupled via power cables 14 to a welding wire feeder 16. The welding power supply may be of any suitable type, which will typically receive power from a power source, such as the power grid, but that may also be powered by a generator set, energy storage devices, and so forth. The welding power supply will typically include one or more operator interfaces that allow welding parameters to be set, such as welding processes, currents, voltages, and so forth. The welding power supply will generally allow for conversion of the source power to a form and level appropriate for a welding operation.

The welding wire feeder 16 receives power from the welding power supply and may exchange data with the welding power supply in certain systems. The wire feeder may similarly include one or more operator interfaces (not shown) that allow for control of certain welding parameters, in addition to wire feed speed. Within the enclosure of the welding wire feeder, a spool 18 of wire is mounted such that welding wire 20 may be drawn from the spool by a drive assembly 22, described in greater detail below. In general, when the welding operation is initiated by the welding operator, the wire drive assembly 22 is powered to draw welding wire from the spool and advance the wire to a welding torch 26 through a torch cable 28. Additional resources may be provided by the wire feeder, such as shielding gas from a gas source 24. This gas also is directed to the welding torch through the torch cable. Finally, a workpiece clamp cable 30 is provided to complete the electrical circuit between the welding wire and the welding power supply. Although shown extending from the wire feeder 16 in FIG. 1, the work clamp cable may extend directly from the welding power supply in certain systems. Once the system is energized and wire is fed from the wire feeder, various types of welding joints may be formed on a workpiece 32. It should be noted that, while a separate power supply and wire feeder are shown in FIG. 1, in some implementations the wire feeder may be incorporated into the power supply.

Figure 2:
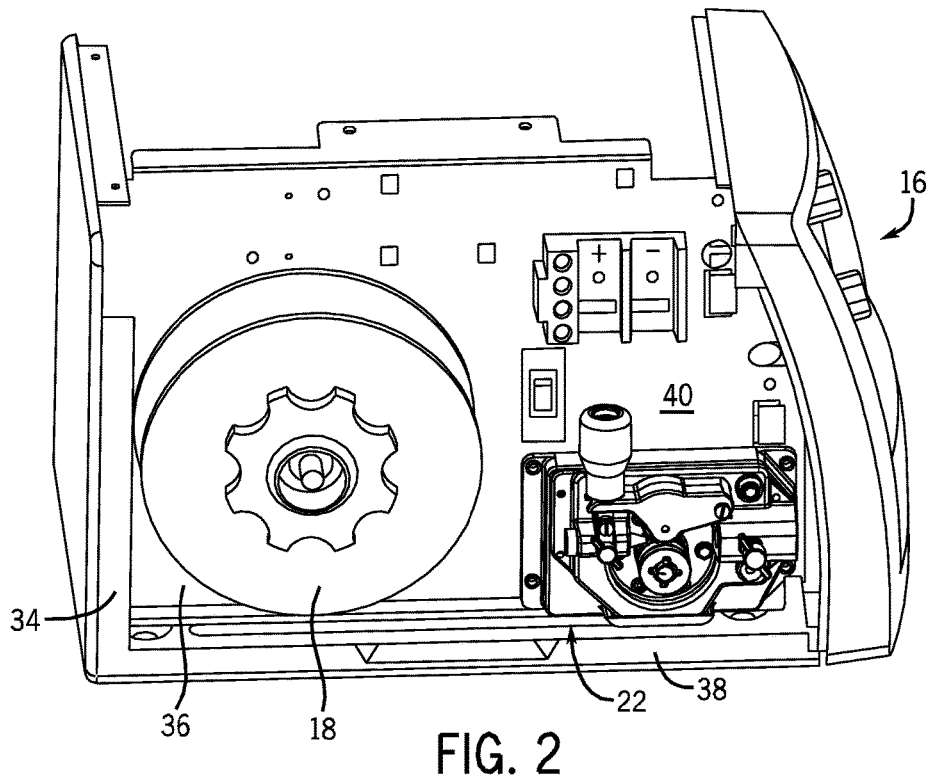
FIG. 2 is a perspective view of a portion of a wire feeder that may be used in a system of the type shown in FIG. 1 having a wire drive assembly in accordance with aspects of the present techniques.

FIG. 2 illustrates and exemplary wire feeder with certain of the operational components removed for clarity. The wire feeder will be housed in an enclosure 34 which is typically made of sheet metal bent and assembled to enclose and support various the various wire feeder components. Certain structures, such as the front plate, interface, and so forth may be made of other materials, such as moldable plastics. A cavity 36 is formed within the enclosure and the components of the wire feeder are secured within this cavity during assembly. In the illustrated embodiment, it may be noted that a lip 38 is formed around the base of the enclosure to retain components within the enclosure and allow for mounting of a shell (removed from the enclosure in FIG. 2) that may be secured in place on the lip and similar flanges around the enclosure. Within the enclosure one or more internal walls 40 may be provided that allow for mounting of the spool 18, the wire drive assembly 22, and so forth.

Figure 3:
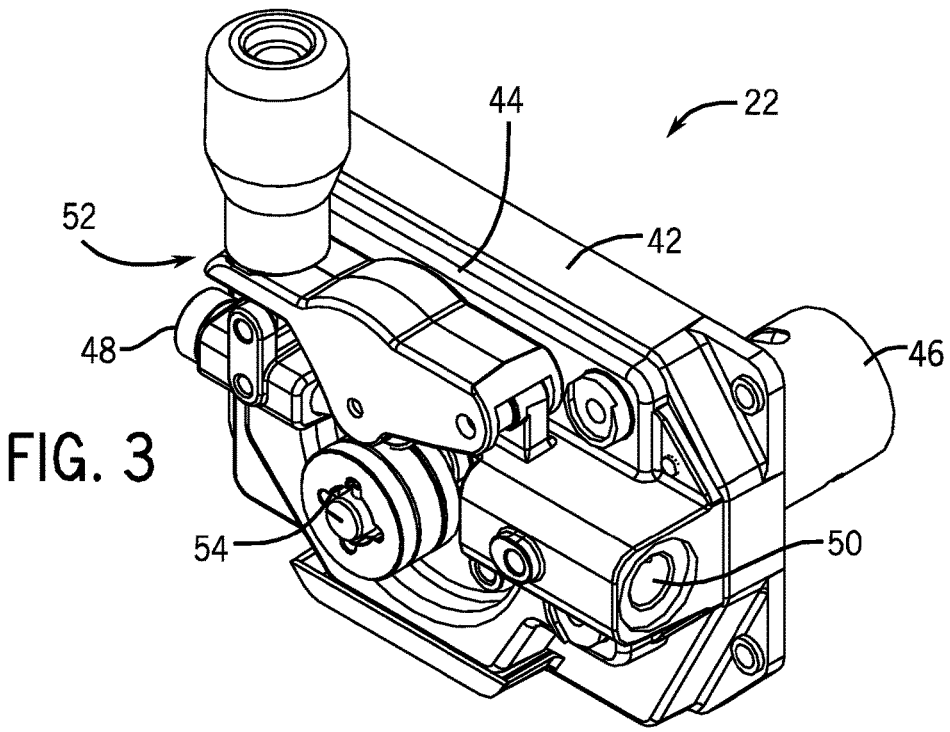
FIG. 3 is a perspective view of the same wire drive assembly.

FIG. 3 is perspective view of an exemplary wire drive assembly 22 incorporating certain innovations in accordance with the present disclosure. In particular, the wire drive assembly 22 comprises an insulating base 42 which may be made of a moldable plastic material, such as acrylonitrile butadiene styrene (ABS; e.g., AF312). The insulating base includes a number of physical design features that aid in mounting of the drive assembly and its various components within the enclosure, as described in greater detail below. A conductive base 44 is secured to the insulating base 42 and serves as a mount for the various components. As discussed below, during operation, the conductive base 44 will be at the welding power potential, whereas the insulating base 42 isolates the conductive base and its mounted components from the enclosure.

Also visible in FIG. 3 is the drive motor 46 which is powered to draw the welding wire from the spool, through the drive assembly to the welding torch cable. The wire is drawn through an inlet 48 and exits through a discharge 50 where the torch cable will be connected. A tension adjustment assembly 52 is provided for regulating the compressive forces on the welding wire as it is drawn through the assembly, and thereby the tension on the wire as it is drawn from the wire spool. Also visible in FIG. 3 is the main drive roll 54 that has grooves adapted to receive the welding wire and to force it through the drive assembly and the downstream welding torch cable.

Figure 4:
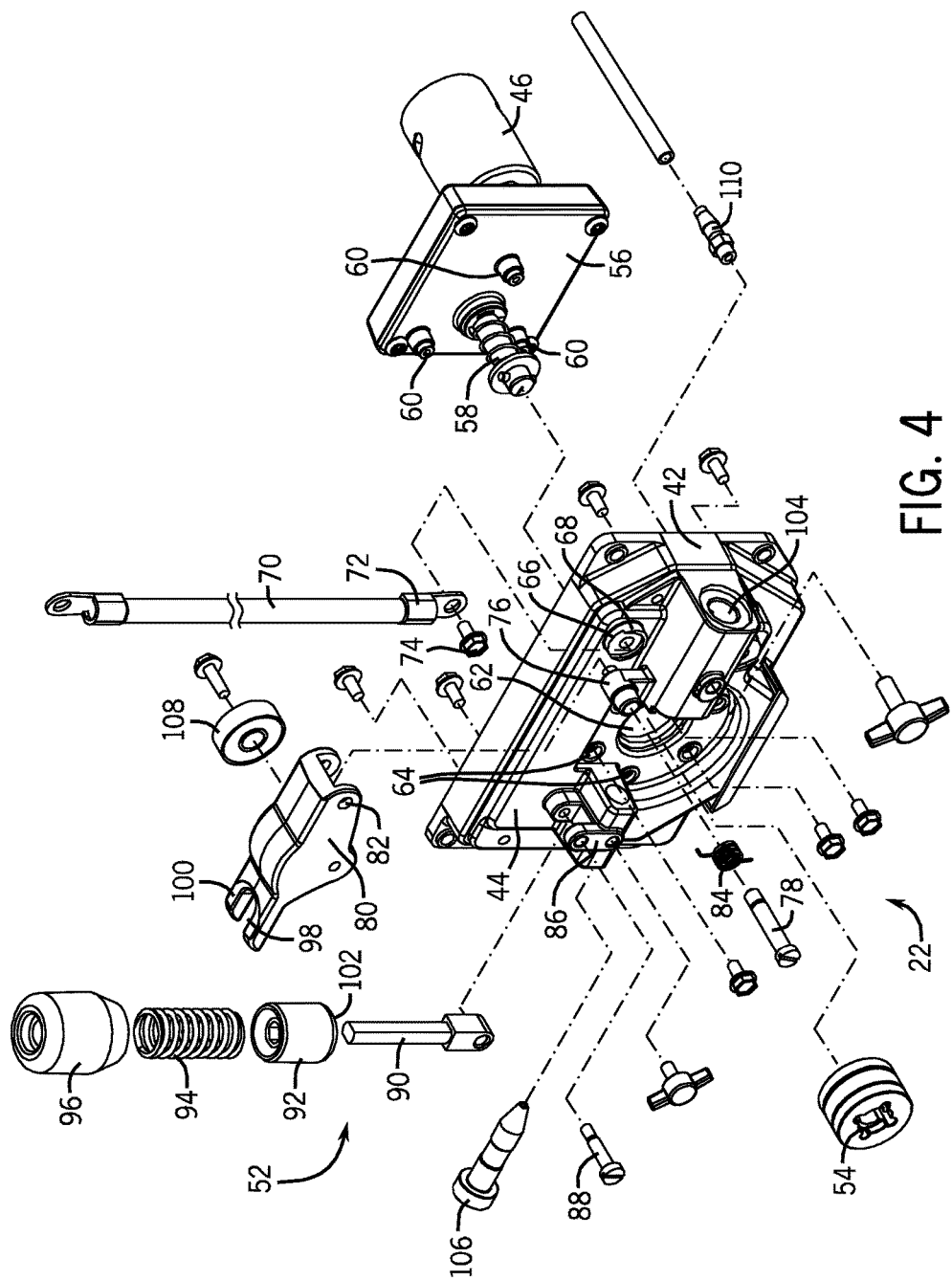
FIG. 4 is an exploded view of certain of the components of the wire drive assembly.

FIG. 4 is a detailed exploded view of certain of the components of the exemplary drive assembly of FIG. 3. As noted above, the assembly includes a drive motor 46 which is powered to drive the wire through the assembly to the welding torch. The motor 46 is coupled directly to a gear reducer 56 that reduces the output speed applied to an output spindle 58. Several mounting projections 60 extend from the gear reducer housing and allow for mounting of the gear reducer, motor and spindle as a subassembly as described below. The insulating base 42 and the conductive base 44 have openings 62 for allowing the spindle 58 to pass through. A series of apertures 64 are formed around this opening and may receive the mounting projections 60 in various angular orientations owing to the positioning and number of projections and the number of apertures. Bolts are received in these projections to hold the motor and gear reducer subassembly on the insulating base and conductive base.

The conductive base further includes a terminal 66 partially surrounded by an alignment ridge 68. Welding power is applied to the conductive base by a power cable 70 at the end of which a ring terminal 72 is secured. The ring terminal is connected to the terminal 66 such that the alignment ridge 68 effectively prevents rotation of the ring terminal as a mounting bolt 74 is inserted and secured through the ring terminal and the terminal 66. This alignment ridge allows for tight securement of the ring terminal to the conductive base, ensuring good electrical contact, while preventing rotation of the ring terminal and power cable with the bolt.

The conductive base further comprises a pivot support 76 that is designed to receive a shoulder screw 78. The shoulder screw, in cooperation with the pivot support, allow for pivotable mounting of a lever 80. As shown, a clevis end 82 of this lever is fitted around the pivot support 76 and the shoulder screw 78 is introduced to form the pivot axis of the lever. It may be noted that the use of a shoulder screw of this application greatly simplifies assembly, insomuch as the shoulder of the screw abuts an internal surface allowing for limitation of insertion of the shoulder screw. A torsion spring 84 is provided between on a portion of the pivot support and the lever to allow for biasing the lever upwardly, thereby facilitating introduction of the welding wire prior to compression of the welding wire for drive purposes.

A conductive base 44 further includes an adjuster mount 86 for receiving the tension adjustment assembly 52 mentioned above. The tension adjustment assembly is secured to the adjuster mount by a shoulder screw 88 that, here again, greatly simplifies assembly insomuch as it ultimately abuts a portion of the mount to limit its insertion. The shaft of the shoulder screw 88 forms a rotational axis of a shaft 90 of the adjustment assembly. A spring cup 92 is received on the shaft and a biasing spring 94 is disposed in the cup. The biasing spring 94 also extends into an adjustment knob 96 which is threaded onto a corresponding threaded upper end of the shaft 90. By rotation of the knob 96, the spring cup 92 may be driven upwardly or downwardly on the shaft 90 to allow for controlled movement of the lever 80 and thereby to control the force applied to the welding wire. In the illustrated embodiment, a slot 98 is provided in lever 80 to receive the shaft 90. Moreover, a contoured recess 100 is formed about this slot that corresponds in contour to a radiused lower face 102 of the spring cup. This complimentary contouring allows the spring cup to seat very well in the lever, and to remain centered in the slot as the assembly is adjusted.

Finally, at the exit or discharge side of the conductive base 44, a torch cable connection 104 is provided. At the opposite inlet side, a wire guide 106 is disposed in a portion of the adjuster mount. A thumb screw allows for capturing this wire guide which may be toollessly mounted and released for periodic replacement when worn. An idler roll 108 is mounted within the lever 80 to complete the assembly. This idler roll, when mounted, faces a portion of the drive roll 54 to receive the welding wire therebetween. Adjustment of the position of lever 80 by means of the tension adjustment assembly allows for the idler roll 108 to be raised and lowered slightly or in most cases to change the force exerted by the spring of the adjustment assembly, thereby adjusting the compressive force applied to the welding wire. A gas fitting 110 is provided to receive shielding gas when the welding process and wire call for such resources.

In operation, welding power is applied to cable 70 and through the ring terminal 72 to the conductive base 44. The energized conductive base, then, transfers electrical power to a conductor in the torch cable (that continues through the welding torch to the welding wire at the point of exit from the welding torch). The wire is drawn through the assembly by powering motor 46 which drives the gear reducer 56 and spindle 58. The spindle rotation consequently rotates the drive roll 54, which is in contact with the welding wire as is the idler roll 108. The compressive force between these two rolls is regulated by adjustment of the tension adjustment assembly 52. Where desired, shielding gas may be introduced into the assembly and the shielding gas will pass through the conductive base to join the welding wire as it exits the torch cable connection 104 into the torch cable and ultimately into the welding torch. Operator adjustment of the wire feed speed control results in changes in the rotational speed of motor 46, thereby allowing for wire drive speeds to be regulated in the assembly.

Several important innovations are included in the assembly. For example, as noted above, the use of shoulder screws for pivot axes and mounting of the lever 80 and the tension adjustment assembly 52 greatly facilitate assembly, and reduce cost. Similarly, the provision of the recess around slot 98 in the lever, along with the corresponding radiused lower surface 102 of the spring cup 92 aid in maintaining the adjustment assembly solidly in place and predicatively adjusting the compressive forces on the welding wire. Moreover, the alignment ridge 68 that effectively forms an anti-rotation pocket in the terminal 66 facilitates assembly of the cable 70 to the conductive base while resisting rotation of the ring terminal in the terminal 66.

Figure 5:
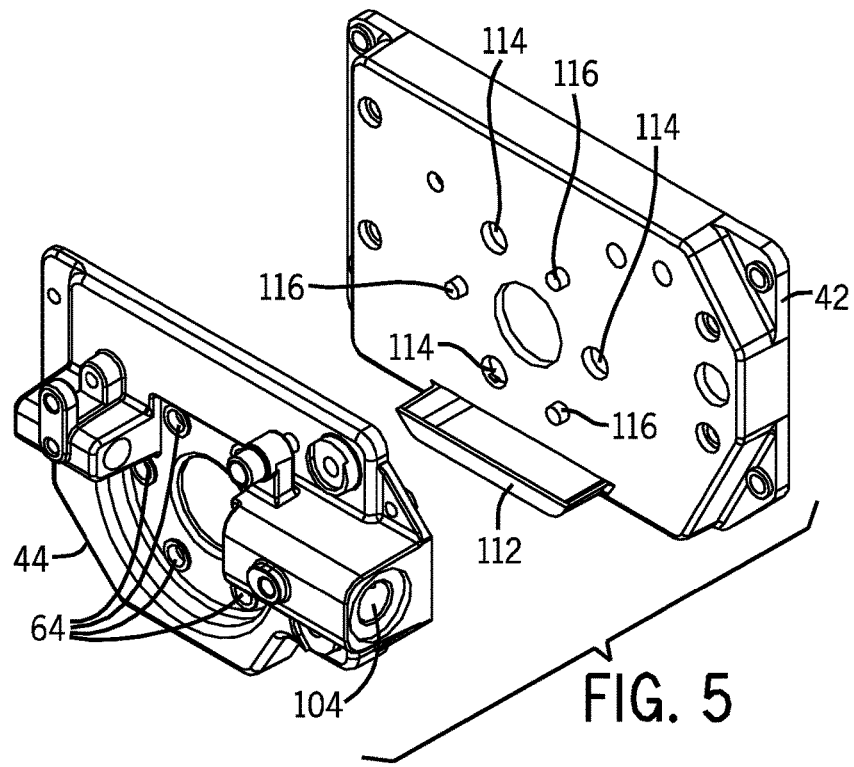
FIG. 5 is an exploded view of two of the central components of the wire drive assembly.

FIG. 5 illustrates certain innovations in the insulating base 42 and a conductive base 44. As noted above, the insulating base 42 may be made of a moldable plastic material, while in a presently contemplated embodiment the conductive base 44 is made cast aluminum. An insulating guard 112 is provided at a lower position and extends from the insulating base 42 to guard the lower extremity of the conductive base 44 from short circuit with the sheet metal of the enclosure, and particularly in this case with the lower lip 38 (see FIG. 2). Similar extensions could be provided at other locations in the drive assembly. It has been found that due to the compact nature of the particular wire feeder illustrated, and the proximity of the drive assembly to the lip and the lower portions of the cavity, the insulating guard 112 may effectively prevent foreign objects, such as loose screws, nuts, welding wires, and so forth from entering into contact with both the conductive base 44 and conductive parts of the enclosure, thereby causing a short circuit.

Still further, as noted above, several apertures 64 are provided in the conductive base 44 for receiving the mounting projections 60 of the gear reducer. In the illustrated embodiment, three mounting projections 60 (see FIG. 4) extend from the gear reducer and are positioned at 120 degree increments around a bolt circle. Six apertures 46, however, are provided in the conductive base such that the motor and gear reducer may be positioned at various angular orientations (in this case at 60 degree increments). Apertures 114 are formed in the insulating base 42 to permit passage of these. The insulating base may also include projections 116 that extend into certain of the apertures 64 to aid in resisting rotation of the conductive base and insulating base with respect to one another. These features allow for the same conductive base 44 to be used with different insulating bases 42 and with different orientations of motors and gear reducers. In particular, a different insulating base 42 may be formed for different wire feeders, motor and gear reducer configurations, and so forth, while the same casting for the conductive base may be used in the different products. Similarly, the torch cable connection 104 may be machined differently for differently sized connectors, welding torch cables, and so forth. The resulting conductive base 44 may thereby be use in various settings, in conjunction with adapted insulating bases 42.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding wire drive comprising:
   a conductive base plate configured to remain at a welding power potential during operation and to support drive components to draw welding wire from a spool and to advance the welding wire towards a welding torch, the conductive base plate transferring power to a torch cable during operation; and
   an insulating base secured to the conductive base plate and insulating the conductive base plate from an enclosure in which the drive components are disposed, the insulating base having at least one extension integrally formed with the insulating base to prevent foreign objects from entering into contact with the enclosure and the conductive base plate, wherein the at least one extension comprises a recess defined by a non-linear profile, a first conductive portion of the conductive base plate is disposed within the recess, and the non-linear profile is contoured to conform to a surface of the first conductive portion of the conductive base plate disposed within the recess, and wherein the first conductive portion is configured to remain at the welding power potential during operation.

2. The welding wire drive of claim 1, wherein the at least one extension of the insulating base is disposed near a lower extremity of the insulating base.

3. The welding wire drive of claim 1, comprising a motor and gear reducer assembly supported on a side of the insulating base opposite the conductive base plate.

4. The welding wire drive of claim 3, wherein the motor and gear reducer assembly is supported by fasteners extending through a first set of apertures in the insulating base and a second set of apertures in the conductive base plate, wherein the apertures are disposed to permit the motor and gear reducer assembly to be mounted in anyone of a plurality of angular orientations.

5. The welding wire drive of claim 4, wherein the first set of apertures includes fewer apertures than the second set of apertures.

6. The welding wire drive of claim 5, wherein the insulating base comprises extensions that enter into apertures of the conductive base plate through which fasteners are not installed.

7. The welding wire drive of claim 1, comprising a drive roll and an idler roll disposed to compress and drive the welding wire, the idler roll being supported on a lever, and wherein a tension adjustment assembly allows for adjusting forces exerted by the idler roll.

8. The welding wire drive of claim 7, wherein the lever comprises a slot for receiving a shaft of the tension adjustment assembly and a contoured surface at least partially surrounding the slot, and wherein the tension adjustment assembly comprises a compression component having a lower surface contoured to conform to the contoured surface of the lever.

9. The welding wire drive of claim 7, wherein the lever is pivotally mounted on a shoulder screw received in the conductive base plate.

10. The welding wire drive of claim 1, wherein the conductive base plate comprises a terminal having a peripheral ridge that limits rotation of a power conductor when secured to the conductive base plate.

11. A welding wire drive comprising:
a conductive base plate configured to remain at a welding power potential during operation and to support drive components to draw welding wire from a spool and to advance the welding wire towards a welding torch, the conductive base plate transferring power to a torch cable during operation;
an insulating base secured to the conductive base plate and insulating the conductive base plate from an enclosure in which the drive components are disposed via an integral insulating extension, wherein the integral insulating extension comprises a recess defined by a non-linear profile, a first conductive portion of the conductive base plate is disposed within the recess, and the non-linear profile is contoured to conform to a surface of the first conductive portion of the conductive base plate disposed within the recess, and wherein the first conductive portion is configured to remain at the welding power potential during operation; and
a motor and gear reducer assembly supported on a side of the insulating base opposite the conductive base plate;
wherein the motor and gear reducer assembly is supported by fasteners extending through a first set of apertures in the insulating base and a second set of apertures in the conductive base plate, wherein the apertures are disposed to permit the motor and gear reducer assembly to be mounted in anyone of a plurality of angular orientations.

12. The welding wire drive of claim 11, wherein the integral insulating extension is configured to prevent foreign objects from entering into contact with the enclosure and the conductive base plate.

13. The welding wire drive of claim 11, wherein the integral insulating extension of the insulating base is disposed near a lower extremity of the insulating base.

14. The welding wire drive of claim 11, wherein the first set of apertures includes fewer apertures than the second set of apertures.

15. The welding wire drive of claim 14, wherein the insulating base comprises extensions that enter into apertures of the conductive base plate through which fasteners are not installed.

16. A welding wire drive comprising:
a conductive base plate configured to remain at a welding power potential during operation and to support drive components to draw welding wire from a spool and to advance the welding wire towards a welding torch, the conductive base plate transferring power to a torch cable during operation;
an insulating base secured to the conductive base plate and insulating the conductive base plate from an enclosure in which the drive components are disposed, the insulating base having at least one extension integrally formed with the insulating base, wherein the at least one extension comprises a recess defined by a non-linear profile, and a first conductive portion of the conductive base plate is disposed within the recess, wherein the first conductive portion is configured to remain at the welding power potential during operation; and
a motor and gear reducer assembly supported on a side of the insulating base opposite the conductive base plate;
a drive roll, an idler roll and a tension adjustment assembly disposed to compress and drive the welding wire, the idler roll being supported on a lever, the tension adjustment assembly allowing for adjusting forces exerted by the idler roll, the lever comprising a slot for receiving a shaft of the tension adjustment assembly and a continuous curved contoured surface surrounding at least half of the slot, and the tension adjustment assembly comprising a compression component having a curved lower surface with a first contour that is similar to a second contour of the continuous curved contoured surface of the lever.

17. The welding wire drive of claim 16, wherein the at least one extension is an insulating extension and is configured to prevent foreign objects from entering into contact with the enclosure and the conductive base plate.

18. The welding wire drive of claim 17, wherein the at least one extension of the insulating base is disposed near a lower extremity of the insulating base.

19. The welding wire drive of claim 16, wherein the motor and gear reducer assembly is supported by fasteners extending through a first set of apertures in the insulating base and a second set of apertures in the conductive base plate, wherein the apertures are disposed to permit the motor and gear reducer assembly to be mounted in anyone of a plurality of angular orientations.

20. The welding wire drive of claim 19, wherein the first set of apertures includes fewer apertures than the second set of apertures.

* * * * *